United States Patent
Matsuura et al.

(10) Patent No.: US 9,406,912 B2
(45) Date of Patent: Aug. 2, 2016

(54) SEALED BATTERY HAVING A SAFETY VALVE

(75) Inventors: Tomohiro Matsuura, Toyota (JP); Katsumi Ito, Seto (JP); Akira Fujii, Asago (JP); Toshihiro Odagaki, Asago (JP)

(73) Assignees: Toyota Jidosha Kabushiki Kaisha, Toyota-shi, Aichi (JP); Fuji Springs Co., Inc., Asago-shi, Hyogo (JP)

( * ) Notice: Subject to any disclaimer, the term of this patent is extended or adjusted under 35 U.S.C. 154(b) by 984 days.

(21) Appl. No.: 13/375,838

(22) PCT Filed: Apr. 23, 2010

(86) PCT No.: PCT/JP2010/057230
§ 371 (c)(1),
(2), (4) Date: Dec. 2, 2011

(87) PCT Pub. No.: WO2010/140436
PCT Pub. Date: Dec. 9, 2010

(65) Prior Publication Data
US 2012/0114988 A1    May 10, 2012

(30) Foreign Application Priority Data

Jun. 4, 2009    (JP) .................. 2009-135601

(51) Int. Cl.
*H01M 2/12*    (2006.01)
*H01M 2/02*    (2006.01)
*H01M 2/04*    (2006.01)
*H01M 10/0525*    (2010.01)

(52) U.S. Cl.
CPC ............. *H01M 2/024* (2013.01); *H01M 2/043* (2013.01); *H01M 2/1241* (2013.01); *H01M 10/0525* (2013.01); *Y02E 60/122* (2013.01); *Y02T 10/7011* (2013.01)

(58) Field of Classification Search
CPC .................................................... H01M 2/1241
See application file for complete search history.

(56) References Cited

U.S. PATENT DOCUMENTS

| 6,562,508 B1 | 5/2003 | Satoh et al. | |
| 2005/0287422 A1* | 12/2005 | Kim et al. | 429/53 |
| 2007/0059586 A1* | 3/2007 | Matsumoto et al. | 429/53 |

FOREIGN PATENT DOCUMENTS

| CN | 2494083 | 5/2002 |
| JP | 8-212987 | 8/1996 |
| JP | 11-250885 | 9/1999 |
| JP | 2000-149902 | 5/2000 |
| JP | 2001-23595 | 1/2001 |

(Continued)

OTHER PUBLICATIONS

International Search Report in International Application No. PCT/JP2010/057230; Mailing Date: Jun. 8, 2010.

*Primary Examiner* — Barbara Gilliam
*Assistant Examiner* — Stephan Essex
(74) *Attorney, Agent, or Firm* — Finnegan, Henderson, Farabow, Garrett & Dunner, LLP

(57) ABSTRACT

A sealed battery is provided in which a case is partially provided with a safety valve that is provided with a thin portion, which is formed thinner than the peripheral portion of the safety valve. A portion of the safety valve surrounding the thin portion is provided with a slit for preventing heat conduction from the other portions of the case to the thin portion, said slit being formed so as to surround the thin portion.

6 Claims, 7 Drawing Sheets

(56) References Cited

FOREIGN PATENT DOCUMENTS

| | | |
|---|---|---|
| JP | 2007-179793 | 7/2007 |
| JP | 2009-507345 | 2/2009 |
| WO | WO 2007/028152 A2 | 3/2007 |

* cited by examiner

SEALED BATTERY HAVING A SAFETY VALVE

TECHNICAL FIELD

The present invention relates to a sealed battery in which an electrode body and an electrolyte are accommodated within a sealed case, and more particularly, to a sealed battery having a safety valve that opens upon a rise in the internal pressure in the case. The present application is a national phase application of International Application No. PCT/JP2010/057230, filed Apr. 23, 2010, and claims priority to Japanese Patent Application Publication No. 2009-135601, filed on Jun. 4, 2009, the entire contents of which are incorporated herein by reference.

BACKGROUND ART

In recent years, lithium ion batteries and other sealed secondary batteries have gained ever more importance as power sources, for instance as vehicle power sources, and as power sources in personal computers, mobile terminals and the like. Lithium ion batteries, in particular, are lightweight and afford high energy densities, and are thus expected to become preferred high-output power sources installed in vehicles.

Such sealed batteries are provided with an internal pressure releasing mechanism for releasing internal pressure (gas pressure) in case that the gas pressure rises excessively, ordinarily on account of overcharge or the like. In a typical example, for instance such as the one disclosed in Patent document 1, the internal pressure release mechanism may be a safety valve configured in such a manner that a thin portion (typically, made of metal) that is thinner than other portions is formed in part of the case, such gas in the case is released through breakage (splitting) of the thin portion when the internal pressure in the case becomes equal to or higher than a predetermined value (release pressure), to lower thereby the internal pressure in the case. Patent documents 2 and 3 are other prior art documents relating to batteries that are provided with such safety valves.

PRIOR ART

Patent Document

Patent document 1: Japanese Patent Application Publication No. (H) 11-250885
Patent document 2: Japanese Patent Application Publication No. 2001-23595
Patent document 3: Japanese Patent Application Publication No. 2007-179793

DISCLOSURE OF THE INVENTION

As disclosed in Patent document 1, the thin safety valve formed at part of a battery case is ordinarily formed to a smaller wall thickness by means that include, for instance, pressing of a metal sheet of a predetermined material (for instance, aluminum sheet) that makes up the case. As a result, the physical strength (specifically, the tensile strength) of the thin safety valve increases on account of metal hardening (work hardening) that is elicited during such press working. In conventional safety valves, an appropriate valve opening pressure is set beforehand (i.e. there is set the internal pressure in the case for which the safety valve splits open) in accordance with the shape and capacity of the battery. The wall thickness of the thin portion and/or a groove depth of an indented portion that is formed in the thin portion (i.e. a groove portion that becomes the splitting starting point for inducing splitting of the thin portion) is prescribed so as to result in appropriate splitting on account of the pressure from the valve opening pressure. The setting of the wall thickness and groove depth assumes that the safety valve comprises a material that has undergone the above-described work hardening. In itself, doing so is technically appropriate.

In the process for manufacturing an actual sealed battery, an electrode body, as well as various types of electrolyte (typically, an electrolyte solution) that make up the battery are accommodated inside the battery case having a safety valve that is formed by thinning, and undergoes work hardening, through the abovementioned pressing or the like, after which there is performed a sealing process of sealing an opening of the battery case. Ordinarily, the sealing process is performed in accordance with a process that involves heating, for instance welding of a predetermined lid member (sealing plate) onto the opening of the battery case. The heat generated during the heating treatment such as welding is transmitted to the thin portion of the safety valve. As a result, the thin portion of the safety valve and that has undergone work hardening may now soften, contrariwise, on account of so-called annealing elicited by the heat input. This gives rise to a problem in that the safety valve, for which the valve opening pressure had been set assuming work hardening, opens now, due to that softening, at a time where the internal pressure is lower than the set valve opening pressure. This occurrence is undesirable.

Methods for dealing with the above problem include, for instance, setting beforehand a wall thickness of the thin portion and/or a groove depth of an indented portion in such a way so as to enable valve opening at the set valve opening pressure, assuming the occurrence of softening. In practice, however, the occurrence of the annealing and the degree thereof (i.e. the intensity of heating during welding or the like) varies depending on each individual battery. Therefore, it is not possible to predict the degree of annealing and to set beforehand the wall thickness of a thin portion and/or groove depth of an indented portion, across the board, for all batteries that are manufactured in a predetermined production line.

In the light of the above conventional problems, it is an object of the present invention to provide a safety valve having a structure such that the safety valve can split (open) normally at around a valve opening pressure set beforehand, without being affected by a process that involves heating, such as welding or the like. It is also an object of the present invention to provide a sealed battery that comprises such a safety valve.

A battery in one aspect provided by the present invention is a sealed battery comprising an electrode body that constitutes a positive electrode and a negative electrode; an electrolyte; and a case in which the electrode body and the electrolyte are accommodated and sealed. In part of the case there is provided a safety valve that opens when an internal pressure in the case rises to or above a predetermined level. The safety valve is provided with a thin portion that is formed thinner than a peripheral portion of the safety valve.

A slit that prevents conduction of heat from other portions of the case to the thin portion is formed at a peripheral portion of the thin portion of the safety valve, in such a manner that the slit surrounds the thin portion.

In a sealed battery having such a configuration, as described above, the slit (groove portion) is formed in the periphery of thin portion in such a way so as to surround the thin portion that makes up the safety valve.

As a result, this allows hampering conduction (input), to the thin portion that makes up the safety valve, of heat that is transmitted through the case (typically a case made of a metal, such as aluminum), even when the case, in part of which the safety valve is formed, undergoes a process that involves generation of heat, such as a case sealing process during construction of the battery. It becomes likewise possible to suppress the occurrence of "annealing" caused by input of heat to the thin portion.

As a result, there can be provided a sealed battery comprising a safety valve such that softening on account of annealing of the thin portion during the battery manufacturing process is suppressed, so that, accordingly, lowering of the valve opening pressure is suppressed and the safety valve can split (open) normally at around the valve opening pressure that is set beforehand.

Forming such a slit allows not only countering the influence of conduction heat, as described above, but also enhancing attenuation characteristics against vibration. Thus, a safety valve provided in a case of the sealed battery disclosed herein (for instance, provided in a lid body that makes up a case) can be prevented from being damaged by ultrasounds, for instance in a battery manufacturing process that relies on ultrasounds (for instance, a process of ultrasonic welding that is performed for joining a collector terminal to an electrode body). Accordingly, a sealed battery can be provided that comprises a highly reliable safety valve in which deterioration caused by ultrasounds is prevented.

In a preferred aspect of the sealed battery disclosed herein, the slit is formed on an inner surface side of the case, at the peripheral portion of the thin portion of the safety valve.

Such a configuration allows suppressing loss of mechanical strength in the battery case caused by the presence of the slit (in particular, at the periphery of the thin portion). It becomes also possible to reliably prevent the problem of splitting at the slit portion at times where the internal pressure in the case rises abnormally (i.e. in a state such as immediately before opening of the safety valve).

In another preferred aspect of the sealed battery disclosed herein, the slit is formed to a depth that exceeds at least a wall thickness of the thin portion, from a surface of the case. More preferably, the slit is formed to a depth that exceeds 10% the wall thickness, from the case outer surface side to an inner surface side, at the peripheral portion of the thin portion of the safety valve (for instance, to a depth equivalent to 10% to 50% of the wall thickness, preferably a depth equivalent to 10% to 30% of the wall thickness).

Forming the slit to a depth such as the abovementioned one allows preventing more effectively input (conduction) of heat, transmitted through the case, to the thin portion.

In a particularly preferred aspect of the sealed battery disclosed herein, the slit is formed at the periphery of the thin portion in such a manner that a ratio Ws/W of a dimension W of the thin portion in a predetermined direction X to a dimension Ws of the slit formed at the periphery of the thin portion, with the Ws being a dimension across the thin portion in the predetermined direction X, satisfies $1.1 \leq Ws/W \leq 2$ (more preferably, about $1.25 \leq Ws/W \leq 2$, in particular, about $1.5 \leq Ws/W \leq 2$, and for instance, about $1.5 \leq Ws/W \leq 1.75$).

By forming the slit so as to satisfy conditions such as the abovementioned ones, it becomes possible to appropriately reconcile the effect of preventing the occurrence of annealing, as elicited by providing the slit, with an effect of suppressing loss of mechanical strength in the battery case (in particular, at the periphery of the thin portion), caused by the presence of the slit.

In another preferred aspect of the sealed battery disclosed herein, the wall thickness from an outer surface side to an inner surface side of the case, at the peripheral portion of the thin portion of the safety valve at which the slit is formed, is greater than the thickness of an outer periphery portion that lies further outward than the peripheral portion.

The wall thickness in the vicinity of the area at which the slit is formed is made thus deliberately thicker than at the periphery of that area, so that the heat absorption effect of the thick-wall portion can be enhanced as a result. In synergy with the heat conduction hampering effect afforded by the slit, this allows preventing yet more effectively input (conduction) of heat, transmitted through the case, into the thin portion.

Preferably, the present invention can provide a battery that constitutes a lithium secondary battery (typically, a lithium ion battery), as the sealed battery disclosed herein. In lithium secondary batteries, the internal pressure in the case is likely to rise on account of gas generated inside the battery case, and hence lithium secondary batteries are an appropriate target for the use of the present invention.

The sealed battery disclosed herein comprises a safety valve having a structure such that the valve opens, with good precision, when the internal pressure in the case reaches a predetermined level. The sealed battery can be suitably used as a power source for motors (electric motors) that are installed in vehicles, in particular, automobiles or the like. Therefore, the present invention provides a vehicle (typically, an automobile, in particular, an automobile equipped with an electric motor, such as a hybrid automobile, an electric automobile or a fuel cell automobile) that comprises any of the sealed batteries disclosed herein (typically, in the form of a battery pack in which a plurality of the sealed batteries is electrically connected to each other).

BEST MODE FOR CARRYING OUT THE INVENTION

Figure 1:
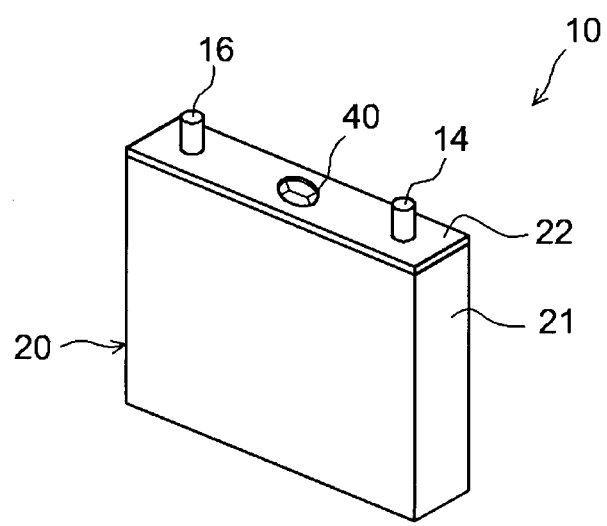
FIG. 1 is a perspective-view diagram illustrating schematically a sealed battery according to one embodiment.

Preferred embodiments of the present invention are explained below with reference to accompanying drawings.

Any features other than the features specifically set forth in the present description and which may be necessary for carrying out the present invention (for instance, the method for construction an electrode body, and the materials used for constructing the electrode body) can be regarded as design matter for a person skilled in the art on the basis of known techniques in the technical field in question. The present invention can be carried out on the basis of the disclosure of the present description and common technical knowledge in the technical field in question.

Although not meant in any way to be limited in thereto, an example of a sealed lithium secondary battery (lithium ion battery) will be explained below wherein a wound-type electrode body (hereafter, "wound electrode body") is accommodated, together with a non-aqueous electrolyte solution, in a square (box-like) case. The dimensional relationships (length, width, thickness and so forth) in the drawings do not reflect actual dimensional relationships. In the drawings, elements and portions that elicit the same effect are denoted with the same reference numerals, and a recurrent explanation thereof will be omitted.

Figure 2:
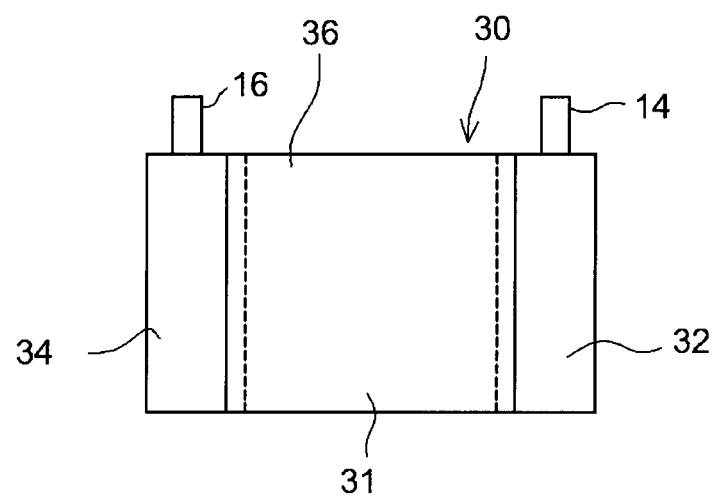
FIG. 2 is a side-view diagram illustrating schematically an electrode body and electrode terminals according to one embodiment.

A lithium ion battery 10 of the present embodiment, has a configuration wherein a wound electrode body 30 such as the one illustrated in FIG. 2 is accommodated in a flat square battery case (i.e. an outer container) 20, such as the one illustrated in FIG. 1, together with a liquid electrolyte (electrolyte solution) not shown.

The case 20 comprises a box-like case body 21 (i.e. a bottomed square tubular shape) having an opening at one end (corresponding to the end portion on the upper side, in a normal use state, of the battery 10 according to the present embodiment); and a lid body (case constituent component) 22 that is attached to the opening and that plugs the opening. A positive electrode terminal 14 and a negative electrode terminal 16 for external connection are fixed to the lid body 22. One end (outward end) of each electrode terminal 14, 16 protrudes out of the case (lid body), while the other end (inward end) is electrically connected to the respective positive electrode 32 or negative electrode 34 of the electrode body 30.

The material of the case 20 is not particularly limited, and may be the identical to materials used in conventional sealed batteries. Preferably, the case 20 is made up mainly of a metallic material that is lightweight and has good thermal conductivity. Examples of such metallic materials include, for instance, aluminum, stainless steel, nickel-plated steel and the like. The case 20 of the present embodiment (specifically, the main body 21 and the lid body 22) are made up of aluminum or an alloy that comprises mainly aluminum. The outline of the lid body 22 is substantially rectangular in shape. Terminal leadout-holes (not shown) that run through the electrode terminals 14, 16 are formed at both end portions of the lid body 22, in the longitudinal direction thereof. A safety valve 40 is formed at a central position, in the width direction, of the portion between the electrode terminals 14, 16, in the lid body 22, the safety valve 40 being configured in such a manner that internal pressure in the case 20 is released when the internal pressure rises to a predetermined level (for instance, an valve opening pressure of about 0.3 to 1.0 MPa) or higher. The safety valve 40 according to the present embodiment, the mechanism thereof, as well as peripheral structures are explained further on.

As illustrated in FIG. 2, the wound electrode body 30 is manufactured in the same way as in wound electrode body in ordinary lithium ion batteries, namely by stacking an elongated sheet-like positive electrode (positive electrode sheet) 32 and a negative electrode (negative electrode sheet) 34 together with two elongate sheet-like separators (separator sheets) 36, winding the resulting stack in the longitudinal direction, and squashing the wound stack from the sides. Specifically, the positive electrode sheet 32 and the negative electrode sheet 34 are stacked at positions slightly offset from each other in the width direction, in such a manner that one edge of each sheet 32, 34, in the width direction, juts respectively out of one end and the other end of the separator sheets. The sheets thus stacked are then wound in that state. As a result, a portion at which one end of the positive electrode sheet 32, in the width direction, juts out of a wound core portion 31 (i.e. portion at which the positive electrode sheet 32, the negative electrode sheet 34 and the separator sheets are tightly wound together), and a portion at which one end of the negative electrode sheet 34, in the width direction, juts out of the wound core portion 31, are formed at one end portion and at the other end portion, respectively, of the wound electrode body 30, in the winding axial direction. The jutting portions are joined to the electrode terminals 14, 16.

The materials and members themselves that make up the wound electrode body 30 are not limited, and may be identical to those of electrode bodies that are provided in conventional lithium ion batteries. For instance, the positive electrode sheet 32 may be configured by forming a positive electrode active material layer on an elongate positive electrode collector (for instance, aluminum foil). The positive electrode active material that is used for forming the positive electrode active material layer is not particularly limited, and may be one, two or more substances that are employed in conventional lithium ion batteries. Suitable examples thereof include, for instance, lithium transition metal oxides such as $LiMn_2O_4$, $LiCoO_2$, $LiNiO_2$ or the like. The negative electrode sheet 34 may be configured by forming a negative electrode active material layer on an elongate negative electrode collector (for instance, copper foil). The negative electrode active material that is used for forming the negative electrode active material layer is not particularly limited, and may be one, two or more substances that are employed in conventional lithium ion batteries. Suitable examples thereof include, for instance, carbon-based materials such as graphite carbon, amorphous carbon or the like, as well as lithium transition metal oxides, lithium transition metal nitrides and the like. Suitable examples of the separator sheets include, for instance, separators made up of porous polyolefin resins.

The liquid electrolyte (electrolyte solution) is not particularly limited, and may be identical to non-aqueous electrolyte solutions that are conventionally used in lithium-ion batteries. The non-aqueous electrolyte solution has typically a composition in which an appropriate non-aqueous solvent contains a supporting salt. As the non-aqueous solvent there may be used, for instance, one, two or more solvents selected from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran and 1,3-dioxolane. As the supporting salt there can be used a lithium salt such as $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$ or the like. In the present embodiment there is used an electrolyte solution that contains a concentration of about 1 mol/L of $LiPF_6$ in a mixed solvent of ethylene carbonate and diethyl carbonate (for instance, at a 1:1 weight ratio). A solid or gel-like electrolyte may be used instead of an electrolyte solution.

An appropriate mode of manufacturing the lithium ion battery 10 provided with members having configurations such as the above-described ones will be briefly explained next.

Firstly, the outward ends of the positive and negative electrode terminals 14, 16 are caused to protrude out of the lid body 22, and the terminals 14, 16 are fixed to the lid body 22. The inward ends of the terminals 14, 16 are connected to the positive electrode 32 and the negative electrode 34 of the wound electrode body 30 (for instance, by welding), to join thereby the lid body 22 and the electrode body 30. The electrode body 30 joined to the lid body 22 is stuffed then through the opening of the case body 21, and the lid body 22 is placed on the opening. The joint between the lid body 22 and the case body 21 is then sealed, for instance through laser welding. The sealing process by laser welding is a typical example of a process that involves heating and that may give rise to the above-described "annealing" in conventional technologies.

Next, an electrolyte solution is injected into the case 20 via an electrolyte solution injection hole not shown. Thereafter, the electrolyte solution injection hole is plugged, to seal the case 20. The sealed lithium ion battery 10 according to the present example can be manufactured (configured) as described above. The way itself in which the battery is constructed is not a characterizing feature of the present invention, and a further detailed explanation thereof will be omitted. The safety valve according to the present embodiment (first embodiment) will be explained in detail below.

Figure 3:
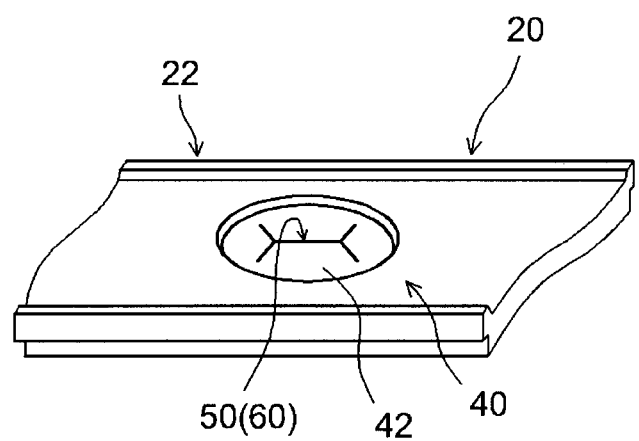
FIG. 3 is a perspective-view diagram illustrating schematically the structure of a safety valve of a sealed battery according to one embodiment.
Figure 4:
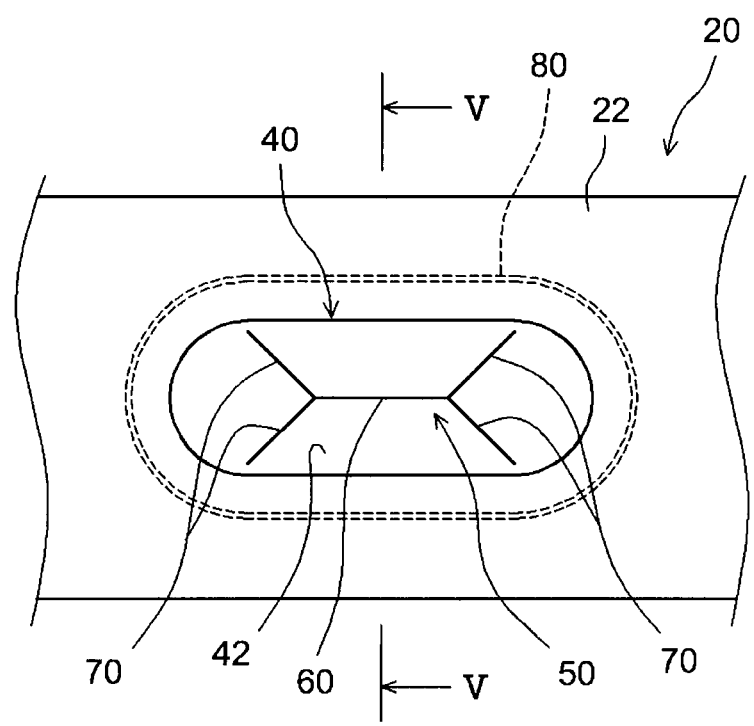
FIG. 4 is a plan-view diagram illustrating the safety valve depicted in FIG. 3.
Figure 5:
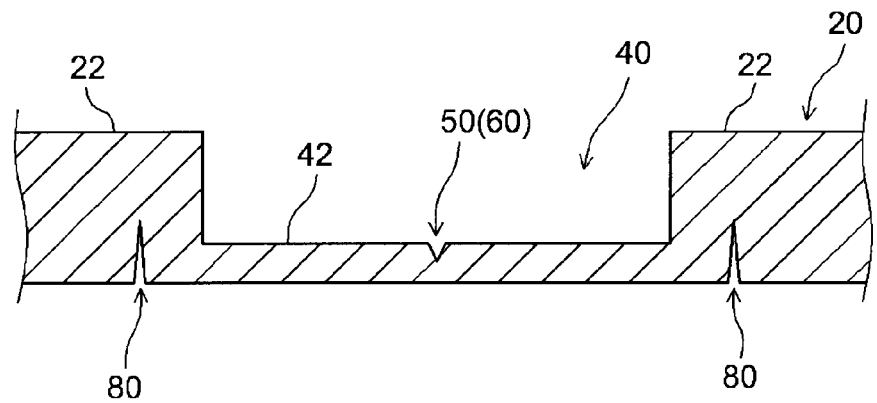
FIG. 5 is a cross-sectional diagram of FIG. 4 along line V-V.

FIG. 3 is a perspective-view diagram illustrating an enlargement of the vicinity of the safety valve 40 that is formed in the lid body 22 of the case 20. FIG. 4 is a plan-view diagram illustrating the shape of the surface side of the safety valve 40. FIG. 5 is a cross-sectional diagram along line V-V.

As illustrated in the figures, the safety valve according to the present embodiment is formed in part of the case 20 (herein, the lid body 22), and comprises a thin portion 42 that is formed thinner than a peripheral portion of the safety valve, and a break groove portion (indented portion) 50, formed to a predetermined pattern, in the thin portion 42. As illustrated in the figure, the thin portion 42 is formed thinner (wall thickness ranging from about 0.1 mm to 0.3 mm, preferably from about 0.1 mm to 0.2 mm, herein of about 0.1 mm) than the case thickness at the peripheral portion of the thin portion 42 (thickness of the lid body ranges from about 0.5 mm to 1 mm, and is herein of about 0.8 mm). The thin portion 42 is formed in such a manner that the horizontal shape thereof exhibits dissimilar sizes in a long axis direction and a short axis direction. Specifically, the peripheral edge has an oblong shape (also called a track shape) comprising a pair of straight line portions along the long axis direction and semicircular curved portions at both ends in that direction, such that the thin portion 42 measures 14 mm in the long axis direction passing through the center point of the thin portion 42, and 4 mm in the short axis direction that passes through the center point. This oblong shape is a typical example of the shape of the thin portion 42, but the shape of the thin portion to which the present invention can be applied is not limited to an oblong shape, and other typical examples include an elliptic shape, a circular shape, a rectangular shape or a square shape. The corners of the square and/or rectangular shape may be curved in the form of quarter-circle, to yield a so-called rounded-corner rectangular shape.

As illustrated in FIG. 4, the break groove portion (indented portion) 50 formed in the thin portion 42 has a central linear groove portion 60 that extends in the long axis direction of the thin portion 42, at the central portion of the thin portion 42, and a pair of side groove portions 70 that are formed on both sides of the central linear groove portion 60, in the long axis direction, and that are joined to the central linear groove portion 60. Although not particularly limited thereto, the break groove portion 50 in the present embodiment extends, in the form of a Y from each end of the central linear groove portion 60, outwards in the long axis direction, in such a manner that the thin portion 42 can be appropriately flipped outwards upon valve opening. The cross-sectional shape of the break groove portion 50 is a V shape that opens to the outer surface side of the thin portion 42.

The wall thickness of the break groove portion 50 is not particularly limited, since the pressure setting for valve opening differs depending on the shape of the battery and on the intended application. For instance, however, the wall thickness of the central linear groove portion 60 may suitably range from 30 μm to 50 μm (for instance, 45 μm) and the wall thickness of the side groove portions 70 may suitably range from 50 μm to 100 μm (for instance, 55 μm).

Providing a safety valve 40 having such a structure allows the sealed lithium ion battery 10 according to the present embodiment to quickly release gas generated in the case 20 through efficient opening of the safety valve when the internal pressure in the case is equal to or higher than a predetermined level.

As the internal pressure in the case rises, specifically, the central linear groove portion 60, as the thinnest portion, breaks (splits) first. This triggers the breakage (splitting) of the side groove portions 70, which in turn causes the thin portion 42 to flip up and open thereby the valve. Such valve opening causes the gas inside the battery case to be released, whereby the internal pressure in the case can be quickly reduced.

A slit 80 according to the present embodiment formed on the periphery of the thin portion will be explained next with reference to accompanying drawings.

As illustrated in FIG. 4 and FIG. 5, the slit 80 is formed, on the inner peripheral side of the case 20 (lid body 22), at the peripheral portion of the thin portion 42, in such a way so as surround the thin portion 42. Although not particularly limited thereto, the width of the opening of the slit of the present embodiment is set to be no greater than 30 μm (for instance, 10 μm to 30 μm), more preferably no greater than 20 μm (for instance, 10 μm to 20 μm), and the slit depth is set to range from 150 μm to 200 μm. The dimension (distance) of the slit 80 across the thin portion 42 is of 8 mm in the short axis direction passing through the center point of the thin portion 42 (top-bottom direction in FIG. 4), and of 18 mm in the long axis direction that passes through the center point of the thin portion 42 (left-right direction in FIG. 4). The distance (dimension) between the thin portion 42 and the slit 80 nearby is of 2 mm in the short axis direction and 2 mm in the long axis direction.

As described above, the slit 80 in the present embodiment is formed to depth that exceeds at least the wall thickness (herein, 100 μm) of the thin portion 42 from the surface of the case 20 (lid body 22).

The slit 80 of the present embodiment is formed to a depth that exceeds 10% the wall thickness (herein, 800 μm), from the case outer surface side to an inner surface side, at the peripheral portion of the thin portion 42 (typically, the slit 80 is formed to a depth equivalent to 10% to 50% of the wall thickness, preferably a depth equivalent to 10% to 30% of the wall thickness).

At the oblong shape thin portion (which may be an elliptical shape or rounded-corner rectangular shaped thin portion), the slit 80 in the present embodiment exhibits a ratio of 8/4, i.e. 2, of the dimension (4 mm) of the thin portion 42 in the short axis direction, as a predetermined direction X and the dimension (8 mm) of the slit 80 in the short axis direction, across the thin portion 42. The ratio of the dimension (14 mm) of the thin portion 42 in the long axis direction, as the predetermined direction X, and the dimension (18 mm) of the slit 80 in the long axis direction across the thin portion 42, is a ratio 18/14, namely 1.28.

Under such conditions, forming the slit 80 at the periphery of the thin portion 42 allows preventing heat from intruding significantly into the thin portion 42, through conduction across the case 20, even upon exposure of the case 20 that is provided with the safety valve 40 (thin portion 42) to a process that involves generation of heat, such as the above-described sealing process by laser welding. This allows, as a result, suppressing occurrence of annealing at the thin portion, and allows preventing the valve opening pressure, set beforehand, from becoming lower. The tests set forth below were performed in order to check experimentally the above features.

Test 1

Figure 6:
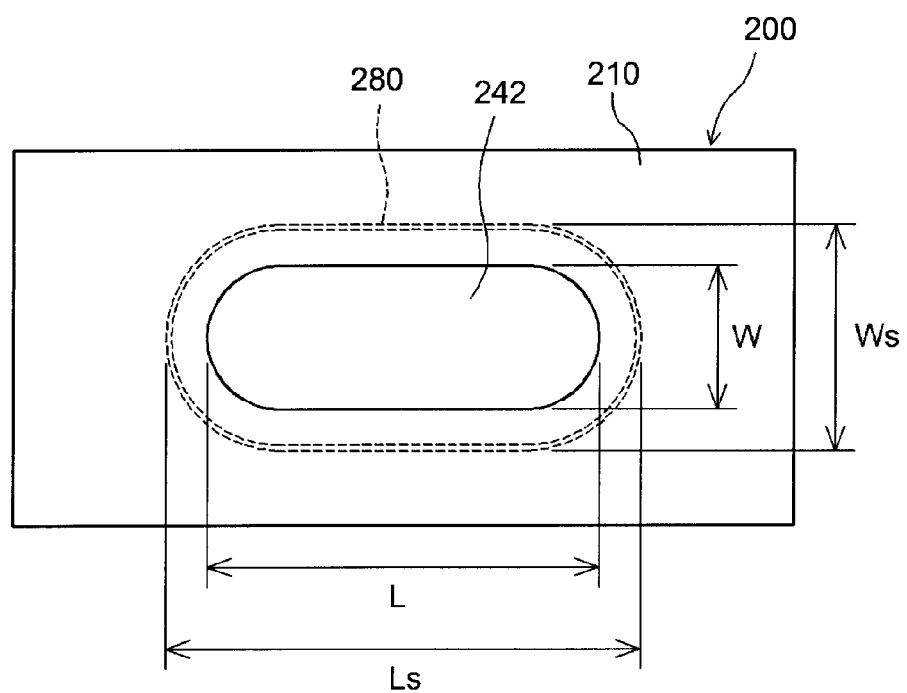
FIG. 6 is a plan-view diagram of a test piece used in a text example of a shape that simulates a safety valve.

A test piece 200 illustrated in FIG. 6 was produced instead of a sealed battery comprising a safety valve according to the present embodiment, such that the test piece 200 had a safety valve of identical shape and having a slit formed on the outer periphery of the safety valve. Specifically, a thin portion 242 having the same oblong shape (track shape) as in the above embodiment was formed in part of an aluminum sheet 210 having a thickness of about 0.8 mm. The wall thickness of the thin portion 242 was set to 100 μm, the dimension L of the thin portion 242 in the long axis direction passing through the center point of the thin portion 242 was set to 14 mm, and the dimension W in the short axis direction passing through the center point was set to 4 mm. In the present test, the dimension Ws of the slit 280 in the short axis direction, across the thin portion 242, was set to 8 mm, and the dimension Ls of the slit 280 in the long axis direction was set to 18 mm. In other words, there was provided a spacing of 2 mm from the peripheral edge of the oblong shape thin portion 242, and a slit was formed along the peripheral edge.

In the present test, various test pieces were prepared in which the slit depth ds was set to 0 mm (i.e., no slit), 0.05 mm, 0.1 mm, 0.15 mm, 0.2 mm, 0.25 mm, 0.3 mm, 0.4 mm and 0.5 mm.

A simulation of the welding process for sealing in an actual battery manufacturing process involved continuous irradiation of a YAG laser along the peripheral edge of the thin portion 242 of each test piece, while keeping a spacing of 5 mm from the peripheral edge (i.e. a spacing of about 3 mm from the slit 280).

After this laser processing, a predetermined gas pressure was applied to the test piece, and the rate of decrease (%) of the valve opening pressure after laser processing vis-à-vis the valve opening pressure before laser processing was worked out. The rate of decrease of durability (%, with the rate of decrease of durability taken as 0 in a case where no slit is present), as influenced by the extent of slit depth, was calculated in accordance with an ordinary CAE (Computer Aided Engineering) analysis method. The results are given in Table 7.

Figure 7:
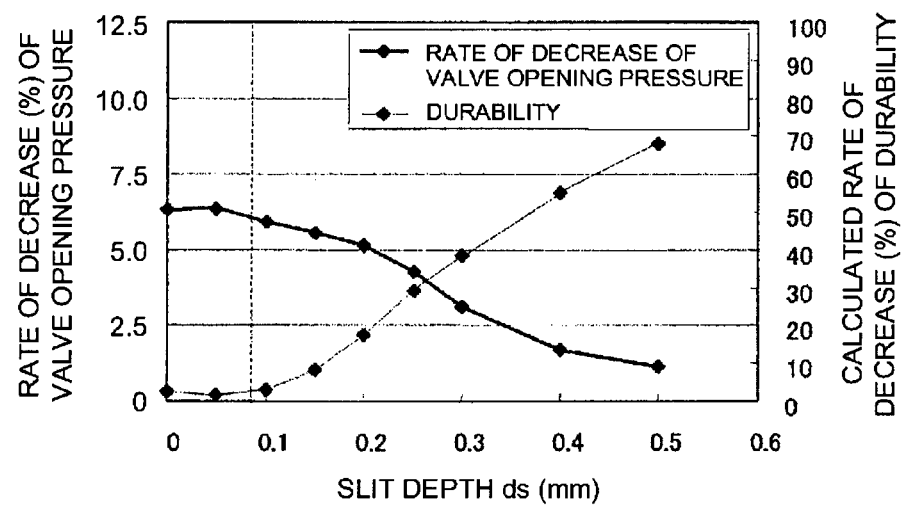
FIG. 7 is a graph illustrating the relationship between slit depth (ds: mm), rate of decrease (%) of valve opening pressure and calculated rate of decrease (%) of durability.

As illustrated in FIG. 7, the rate of decrease (%) of valve opening pressure begins to decrease when the slit depth is about 0.08 mm or greater (boundary line demarcated by the dotted line in the graph). Durability decreases as the slit depth increases, and hence an appropriate range for slit depth is from about 0.08 mm to 0.4 mm, more preferably from about 0.08 mm to 0.25 mm, in terms of striking a balance between both properties.

Test 2

In the present test, there was manufactured a test piece 200 identical to that of Test 1. In the present test, however, the position at which the slit was formed was different. Specifically, various test pieces were manufactured in which the dimension Ws of the slit 280 in the short axis direction across the thin portion 242 ranged from 4 mm (i.e. no slit) to 12 mm, in increments of 1 mm, with respect to the dimension W (4 mm) in the short axis direction passing through the center point of the thin portion 242. Converted to Ws/W, this corresponded to a range of 0 (no slit) to 3, as in the abscissa axis of FIG. 8. In the present test, the depth of the slit 280 was set to 0.2 mm for all the test pieces. The dimension Ls of the slit 280 in the long axis direction across the thin portion 242 of each test piece 200 was set according to the Ws/W for each test piece 200 (L was set to 14 mm, as in Test 1). The slit 280 was formed so as to enclose the thin portion 242 along the outer periphery of the thin portion 242, in such a manner that the distance between the slit 280 and the peripheral edge of the thin portion 242 stayed substantially the same over the entire perimeter of the thin portion 242.

In the same way as in Test 1, a simulation of the welding process for sealing in an actual battery manufacturing process involved continuous irradiation of a YAG laser along the peripheral edge of the thin portion 242 of each test piece, while keeping a spacing of 5 mm from the peripheral edge.

After the laser processing, the temperature (° C.) of the thin portion 242 of each test piece was measured. The residual ratio of durability (%, with the residual ratio of durability taken as 100% in a case where no slit is present), as influenced by changes in the slit dimension Ws (i.e. changes in Ws/W), was calculated in accordance with an ordinary CAE analysis method. The results are given in Table 8.

Figure 8:
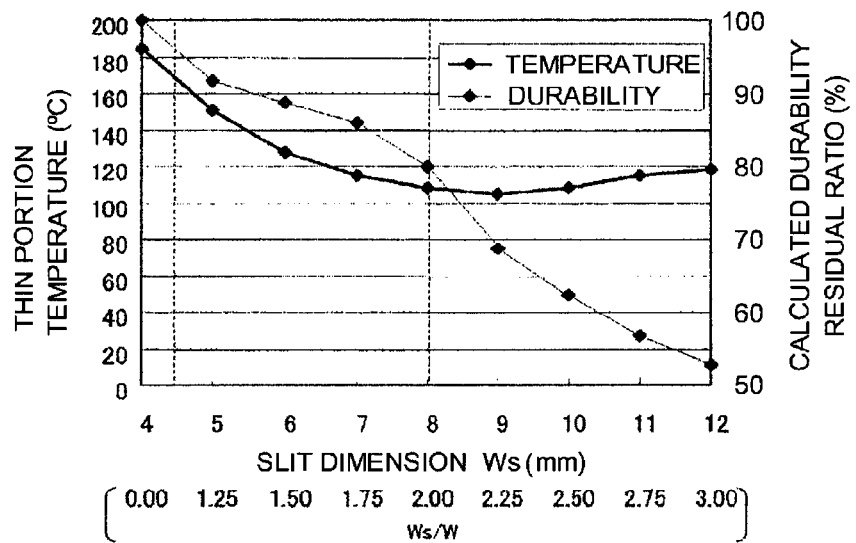
FIG. 8 is a graph illustrating the relationship between a slit dimension (Ws: mm), thin portion temperature (° C.) and calculated durability residual ratio (%).

As illustrated in FIG. 8, it is found that the thin portion temperature (° C.) dropped until the slit dimension Ws was 8 mm (Ws/W=2), ostensibly on account of the formed slit. However, no further temperature drop is observed when the slit dimension Ws exceeds 8 mm Although not particularly limited thereto, one of the reasons for the above finding is that an excessively large Ws/W ratio entails a lower heat mass outward of the slit and a higher temperature in the test piece as a whole. As a result, no effect is elicited. With the extent of durability decrease in mind, the ratio Ws/W is preferably $1.25 \leq Ws/W \leq 2$, in particular, $1.5 \leq Ws/W \leq 2$, and for instance about $1.5 \leq Ws/W \leq 1.75$.

A battery provided with a slit and a safety valve of the first embodiment has been explained above, but the present invention is not meant to be limited to the battery of the above embodiment.

Figure 9:
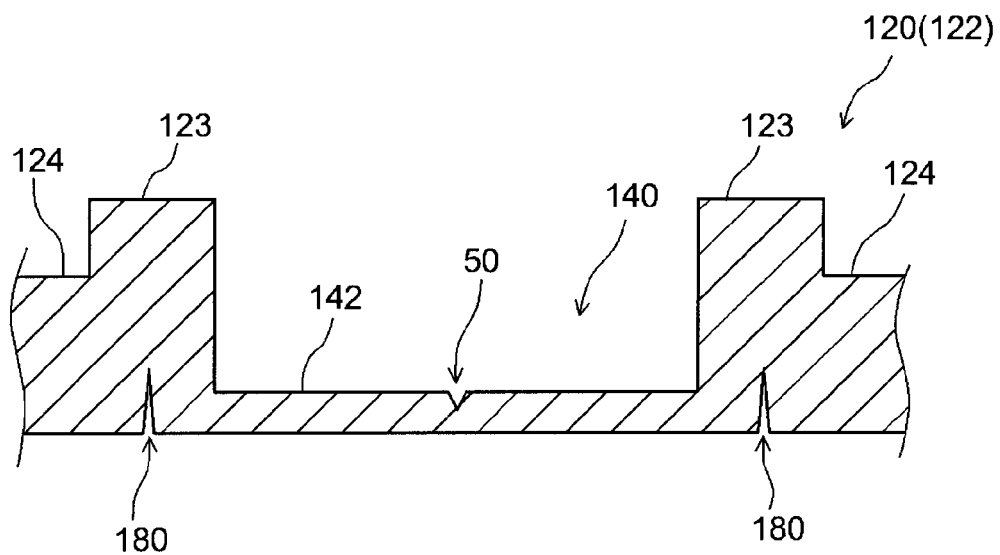
FIG. 9 is a cross-sectional diagram illustrating schematically the structure of a safety valve of a sealed battery according to one embodiment.

The technical scope of the present invention encompasses all manner of variations that allow achieving the purpose of the present invention. For instance, a configuration having the cross-sectional structure illustrated in FIG. 9 may constitute a second embodiment. In the embodiment illustrated in FIG. 9, the wall thickness from the outer surface side to the inner surface side of a case 120 (lid body 122), at a peripheral portion 123 of a safety valve 140 (thin portion 142) where a slit 180 is formed, is greater than the thickness of an outer periphery portion 124 that lies further outward than the peripheral portion. In such a configuration, the wall thickness in the vicinity of the area at which the slit 180 is formed is made deliberately thicker than at the periphery of that area. The heat absorption effect of the thick portion 123 can be enhanced thereby. In synergy with the heat conduction interfering effect afforded by the slit 180, this allows preventing yet more effectively input (conduction) of heat, transmitted through the case 120, into the thin portion 142. The portions not shown in FIG. 9 are identical to those of the battery of the first embodiment, and hence a recurrent explanation thereof will be omitted herein.

The present invention has been explained above on the basis of preferred embodiments, but the features disclosed are not limiting features in any way, and may accommodate various modifications. For instance, the type of battery is not limited to the above-described lithium ion battery, and may be various kinds of battery having dissimilar electrode body constituent materials and/or electrolytes; for instance a lithium secondary battery that uses lithium metal or a lithium alloy as a negative electrode, or a nickel hydride battery or nickel cadmium battery.

Figure 10:
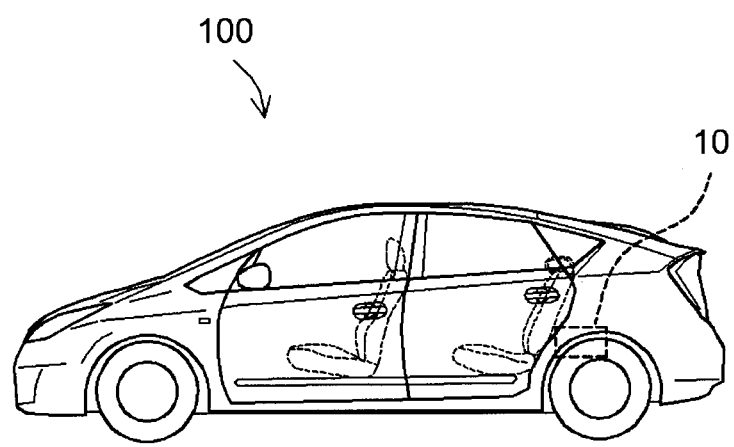
FIG. 10 is a side-view diagram illustrating schematically a vehicle equipped with a sealed battery according to one embodiment of the present invention.

In the sealed battery disclosed herein, the occurrence of annealing due to the heat of the thin portion of the safety valve is prevented, and valve opening can be realized, with greater precision, around the set valve opening pressure. Therefore, the sealed battery can be used as a power source for motors (electric motors), in particular in motors that are installed in vehicles such as automobiles. Accordingly, there is provided also a vehicle 100, as illustrated schematically in FIG. 10 (typically, an automobile, in particular, an automobile equipped with an electric motor, for instance a hybrid automobile or an electric automobile) that comprises the sealed battery 10 (typically, in the form of a battery pack in which a plurality of the batteries 10 is electrically connected to each other).

INDUSTRIAL APPLICABILITY

In the battery 10 according to the present invention, the slit 80 that prevents heat conduction from other portions of the case 20 into the thin portion 42 is formed, at a peripheral portion of the thin portion 42 of the safety valve 40, in such a manner so as to surround the thin portion 42. As a result, it becomes possible to provide the sealed battery 10 in which softening on account of annealing of the thin portion 42 during a manufacturing process is suppressed, and, accordingly, lowering of the valve opening pressure is likewise suppressed, so that the safety valve 40 provided in the sealed battery 10 can split (open) normally at around a valve opening pressure that is set beforehand. By virtue of the above characteristics, the battery 10 of the present invention can be appropriately used as a power source for motors (electric motors) that are installed in vehicles, in particular in automobiles or the like.

The invention claimed is:

1. A sealed battery comprising
an electrode body that constitutes a positive electrode and a negative electrode;
an electrolyte;
a case in which the electrode body and the electrolyte are accommodated and sealed; and
a safety valve formed in part of the case, the safety valve being configured to open when an internal pressure in the case rises to or above a predetermined level, wherein
the safety valve is formed from a part of the case itself,
the safety valve has a thin portion that is thinner than a peripheral portion of the safety valve, the thin portion being integrally formed with the case by thinning a part of the case,
the thin portion of the safety valve is formed on an inner surface side of the case, and
a slit, which prevents conduction of heat, to the thin portion, from another portion of the case, is formed on an inner surface side of the case at a peripheral portion of the thin portion, to a depth, from the inner surface of the case at a peripheral portion of the thin portion that exceeds at least a wall thickness of the thin portion, in such a manner that the slit surrounds the thin portion, wherein the peripheral portion of the thin portion at which the slit is formed is thicker than the thin portion.

2. The sealed battery according to claim 1, wherein the slit is formed to a depth that exceeds 10% the wall thickness, from a case outer surface side to an inner surface side, at the peripheral portion of the thin portion of the safety valve.

3. The sealed battery according to claim 1, wherein the slit is formed at the periphery of the thin portion in such a manner that a ratio Ws/W of a dimension W of the thin portion in a predetermined direction X to a dimension Ws of the slit formed at the periphery of the thin portion, with the Ws being a dimension across the thin portion in the predetermined direction X, satisfies $1.1 \leq Ws/W \leq 2$.

4. The sealed battery according to claim 1, wherein the wall thickness from the outer surface side to the inner surface side of the case, at the peripheral portion of the thin portion of the safety valve at which the slit is formed, is greater than the thickness of an outer periphery portion that lies further outward than the peripheral portion.

5. The sealed battery according to claim 1, constituting a lithium secondary battery.

6. A vehicle, comprising the sealed battery according to claim 1.

* * * * *